US011089860B2

(12) United States Patent
Paratore

(10) Patent No.: US 11,089,860 B2
(45) Date of Patent: Aug. 17, 2021

(54) TOOL FOR SERVICING A STRUCTURE

(71) Applicant: David Henry Paratore, New York, NY (US)

(72) Inventor: David Henry Paratore, New York, NY (US)

(*) Notice: Subject to any disclaimer, the term of this patent is extended or adjusted under 35 U.S.C. 154(b) by 275 days.

(21) Appl. No.: 16/217,116

(22) Filed: Dec. 12, 2018

(65) Prior Publication Data

US 2020/0187633 A1    Jun. 18, 2020

(51) Int. Cl.
| | |
|---|---|
| *A46B 5/00* | (2006.01) |
| *A47L 13/12* | (2006.01) |
| *F16B 7/10* | (2006.01) |
| *B25G 1/04* | (2006.01) |
| *B08B 1/00* | (2006.01) |
| *A47L 13/20* | (2006.01) |

(52) U.S. Cl.
CPC ............ *A46B 5/005* (2013.01); *A46B 5/0083* (2013.01); *A46B 5/0095* (2013.01); *A47L 13/12* (2013.01); *A46B 5/0079* (2013.01); *A47L 13/20* (2013.01); *B08B 1/001* (2013.01); *B25G 1/04* (2013.01); *F16B 7/105* (2013.01)

(58) Field of Classification Search
CPC ..... A46B 5/005; A46B 5/0083; A46B 5/0095; A46B 5/0079; A47L 13/12; A47L 13/20; B08B 1/001; B25G 1/04; F16B 7/105
See application file for complete search history.

(56) References Cited

U.S. PATENT DOCUMENTS

| | | | |
|---|---|---|---|
| 3,407,424 A | 10/1968 | Lanzarone | |
| 4,277,197 A | 7/1981 | Bingham | |
| 5,606,761 A | 3/1997 | Lynch | |
| 6,105,194 A * | 8/2000 | Rudolph | A46B 5/005 15/143.1 |
| 6,701,578 B1 | 3/2004 | Lu | |
| 8,375,500 B1 * | 2/2013 | Aguirre | A46B 5/0095 15/144.1 |
| 9,498,879 B1 * | 11/2016 | Morad | B25G 3/12 |
| 9,648,862 B1 * | 5/2017 | Lievano | A01M 7/005 |
| 2002/0184725 A1 * | 12/2002 | Vosbikian | A46B 7/04 15/176.2 |
| 2008/0016638 A1 * | 1/2008 | Morris | A47L 13/258 15/228 |

(Continued)

OTHER PUBLICATIONS

International Search Report dated Feb. 11, 2020 in International Application No. PCT/US2019/065393.

(Continued)

*Primary Examiner* — Weilun Lo
(74) *Attorney, Agent, or Firm* — Kim IP Law Group LLC

(57) ABSTRACT

A tool for cleaning a structure is provided. The tool includes an extension pole having a length, the extension pole including three or more cylindrical segments having different respective diameters, the segments being arranged in a telescoping configuration to permit the length of the extension pole to be adjusted to a desired length; locking nuts structured to releasably lock adjacent ones of the segments to one another; a grip provided on a most proximal one of the segments; and an attachment member provided on a most distal one of the segments, the attachment member being structured to removably attach at least one cleaning accessory.

17 Claims, 9 Drawing Sheets

(56) References Cited

U.S. PATENT DOCUMENTS

| | | | |
|---|---|---|---|
| 2008/0209647 A1* | 9/2008 | Morgan | A46B 7/04 15/4 |
| 2009/0094791 A1 | 4/2009 | Blom | |
| 2011/0056035 A1* | 3/2011 | Burbacki | A46B 5/0095 15/144.1 |
| 2015/0272310 A1* | 10/2015 | Butler | A46B 7/042 15/176.5 |
| 2019/0254411 A1* | 8/2019 | Staniszewski | A46B 5/0095 |

OTHER PUBLICATIONS

Written Opinion dated Feb. 11, 2020 in International Application No. PCT/US2019/065393.

* cited by examiner

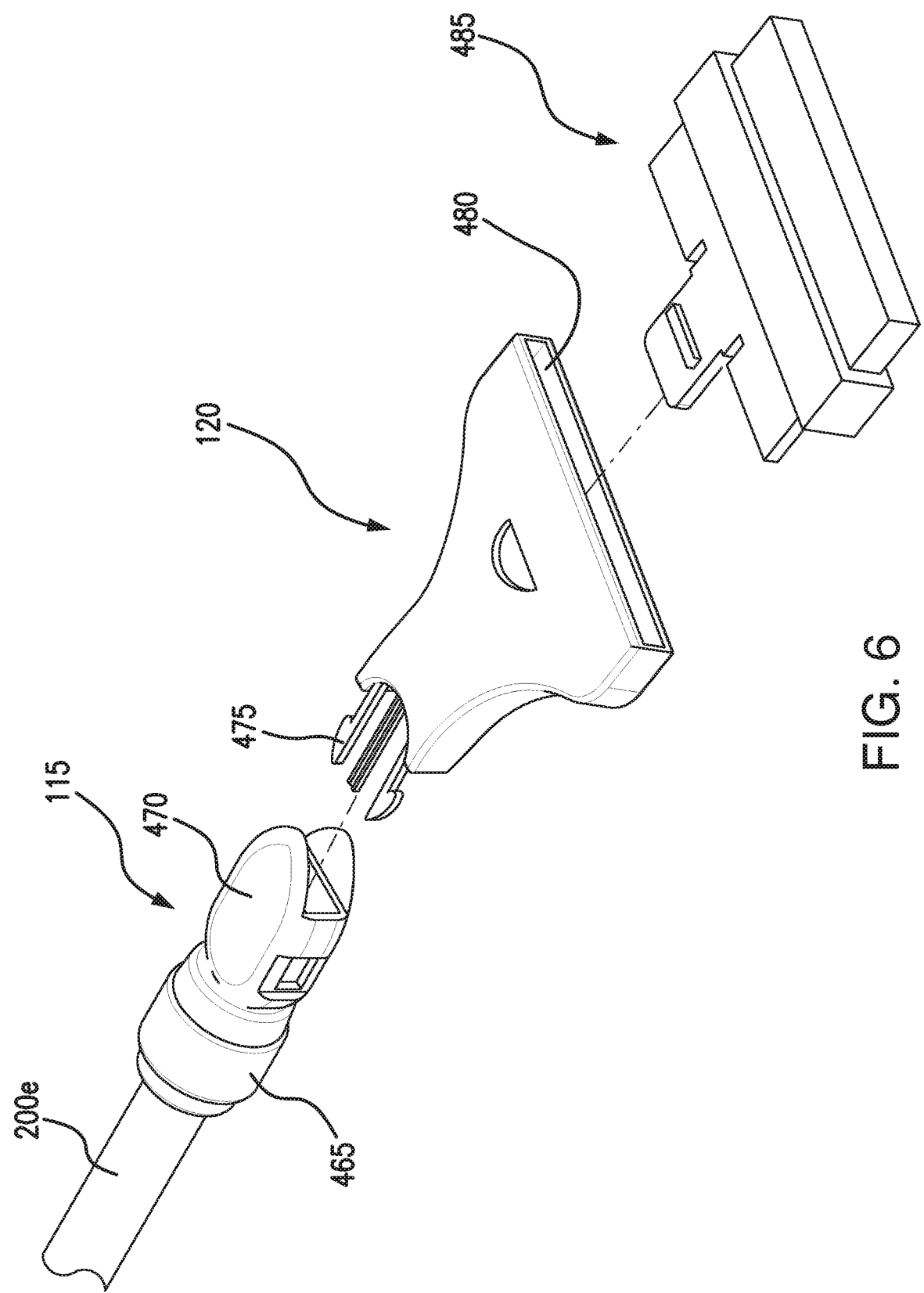

TOOL FOR SERVICING A STRUCTURE

FIELD OF INVENTION

The present invention relates to tools for servicing structures and, in particular, to a tool for cleaning and/or servicing an aquarium.

BACKGROUND OF THE INVENTION

Fish aquariums provide a pleasingly aesthetic feature in various environments, such as in homes, office buildings, lounges, etc. However, over time, deposits and other undesirable contaminants in water (such as algae) may build up on the inside surfaces of the aquarium, thereby requiring the aquarium to be serviced and/or cleaned from time to time. Unfortunately, tools known in the art today for servicing and/or cleaning aquariums are constructed poorly from unsuitable materials and/or are disadvantageously structured to service only certain sized aquariums. This may require servicing personnel to continually replace broken tools and/or maintain different sized tools for cleaning different sized aquariums (or other structures). There is, thus, a need in the art for a tool that overcomes these and other disadvantages.

SUMMARY OF THE INVENTION

In accordance with one aspect of the present invention, a tool for cleaning an aquarium is provided. The tool includes an extension pole having a length, the extension pole including first, second, third, fourth and fifth cylindrical segments, the first cylindrical segment having a first diameter, the second cylindrical segment having a second diameter less than the first diameter and being slidably received within the first cylindrical segment, the third cylindrical segment having a third diameter less than the second diameter and being slidably received within the second cylindrical segment, the fourth cylindrical segment having a fourth diameter less than the third diameter and being slidably received within the third cylindrical segment, the fifth cylindrical segment having a fifth diameter less than the fourth diameter and being slidably received within the fourth cylindrical segment; a first locking nut positioned between and slidably receiving the first and second cylindrical segments, the locking nut being structured to releasably lock the second cylindrical segment into a desired position with respect to the first cylindrical segment; a second locking nut positioned between and slidably receiving the second and third cylindrical segments, the locking nut being structured to releasably lock the third cylindrical segment into a desired position with respect to the second cylindrical segment; a third locking nut positioned between and slidably receiving the third and fourth cylindrical segments, the locking nut being structured to releasably lock the fourth cylindrical segment into a desired position with respect to the third cylindrical segment; a fourth locking nut positioned between and slidably receiving the fourth and fifth cylindrical segments, the locking nut being structured to releasably lock the fifth cylindrical segment into a desired position with respect to the fourth cylindrical segment; a grip provided on the first cylindrical segment; and an attachment member provided on the fifth cylindrical segment, the attachment member being structured to removably attach at least one cleaning accessory.

In accordance with another aspect of the present invention, the first cylindrical segment includes outer screw threads, and the first locking nut includes a first longitudinal bore for slidably receiving the second cylindrical segment, a second longitudinal bore for slidably receiving the first cylindrical segment, a cylindrical tab for frictionally maintaining the second cylindrical segment into the desired position with respect to the first cylindrical segment, and inner screw threads for engaging the outer screw threads of the first cylindrical segment, the second cylindrical segment includes outer screw threads, and the second locking nut includes a first longitudinal bore for slidably receiving the third cylindrical segment, a second longitudinal bore for slidably receiving the second cylindrical segment, a cylindrical tab for frictionally maintaining the third cylindrical segment into the desired position with respect to the second cylindrical segment, and inner screw threads for engaging the outer screw threads of the second cylindrical segment, the third cylindrical segment includes outer screw threads, and the third locking nut includes a first longitudinal bore for slidably receiving the fourth cylindrical segment, a second longitudinal bore for slidably receiving the third cylindrical segment, a cylindrical tab for frictionally maintaining the fourth cylindrical segment into the desired position with respect to the third cylindrical segment, and inner screw threads for engaging the outer screw threads of the third cylindrical segment, and the fourth cylindrical segment includes outer screw threads, and the fourth locking nut includes a first longitudinal bore for slidably receiving the fifth cylindrical segment, a second longitudinal bore for slidably receiving the fourth cylindrical segment, a cylindrical tab for frictionally maintaining the fifth cylindrical segment into the desired position with respect to the fourth cylindrical segment, and inner screw threads for engaging the outer screw threads of the fourth cylindrical segment.

In accordance with still another aspect of the present invention, the cylindrical segments are constructed from one or more materials suitable for use in a water environment, such as graphite, aluminum, carbon fiber, steel, plastic, and/or wood.

In accordance with yet another aspect of the present invention, the attachment member includes a female clip member configured to removably mate with a male clip member of the at least one cleaning accessory.

In accordance with still another aspect of the present invention, the fifth cylindrical segment is provided with outer screw threads and the attachment member includes a threaded receptacle structured to screwably couple with the outer screw threads of the fifth cylindrical segment.

In accordance with yet another aspect of the present invention, the at least one cleaning accessory includes one of a fiber pad, a sponge, and a scraper.

In accordance with still another aspect of the present invention, the attachment member includes a receiving slot for removably receiving at least one operating tip.

In accordance with yet another aspect of the present invention, the grip is constructed from Ethylene-Propylene-Diene-Monomer, Nitrile PVC, sponge, polymer, wood, and/or plastic.

In accordance with still another aspect of the present invention, at least one of the cylindrical segments is provided with a hole to permit drainage of water.

BRIEF DESCRIPTION OF THE DRAWINGS

FIG. 4b is a sectional view of the exemplary locking mechanism shown in FIG. 4a.

FIG. 6 is a perspective view of an exemplary accessory, according to the present invention.

DETAILED DESCRIPTION

Figure 1:
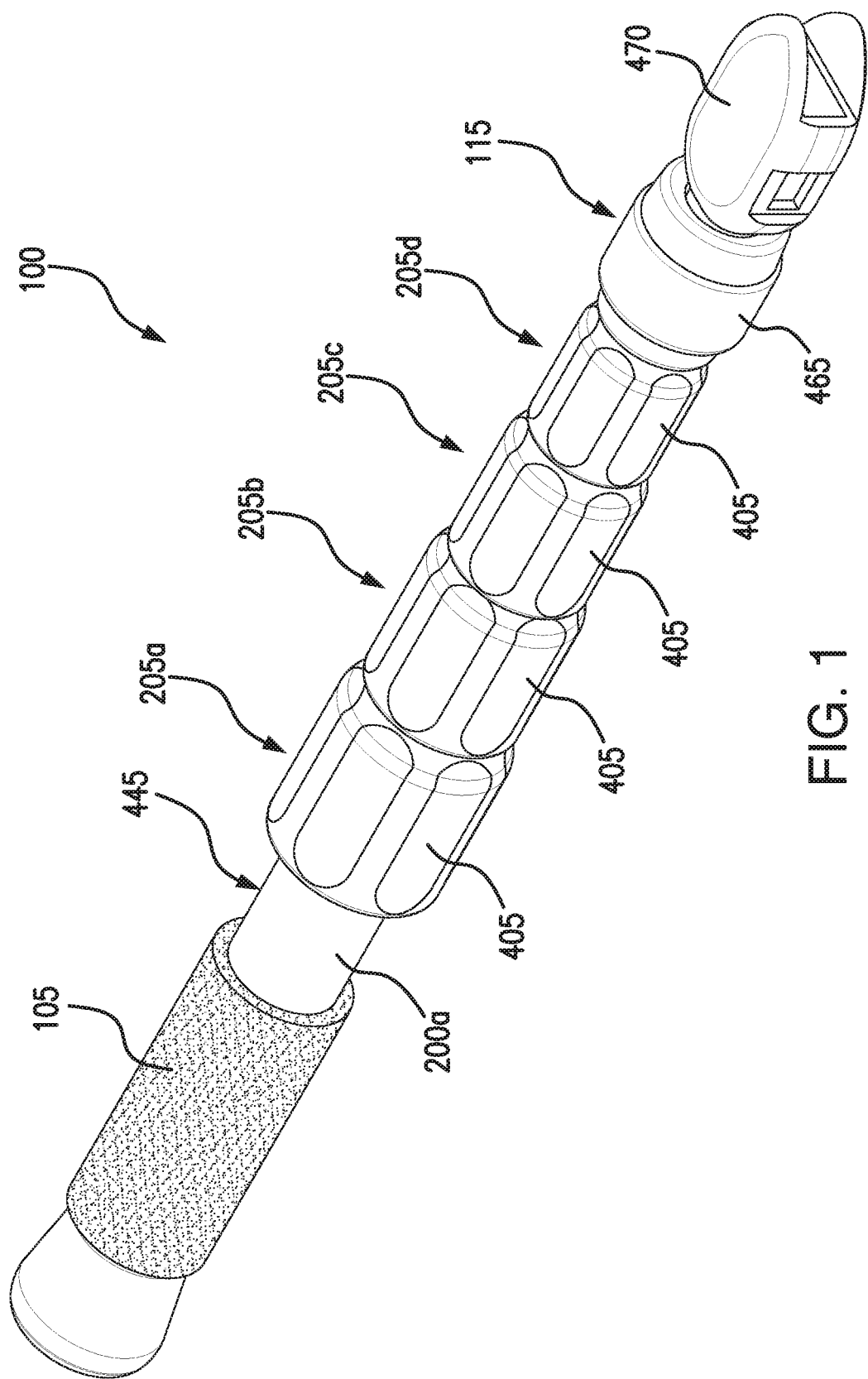
FIG. 1 is a perspective view of an assembled tool according to the present invention.
Figure 2:
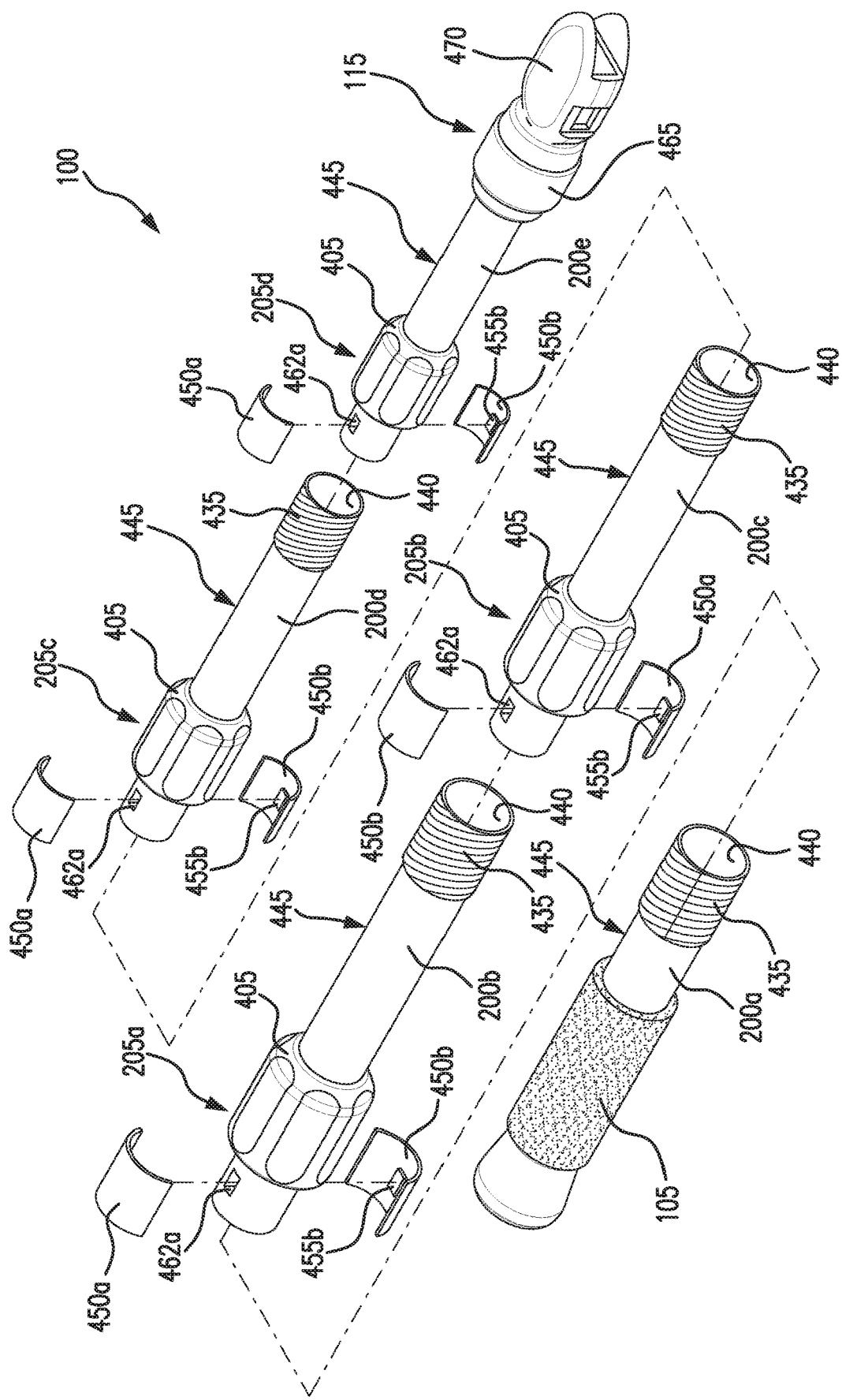
FIG. 2 is an exploded view of the tool illustrated in FIG. 1.

Referring now to FIGS. 1 and 2, there is seen assembled and exploded views, respectively, of an exemplary tool 100 according to the present invention. Tool 100 may be employed by a user for servicing various structures, such as, for example, aquariums. Tool 100 includes an extension pole 110 structured to be adjusted to a plurality of lengths for adjusting a length of tool 100, a grip portion 105 coupled to a proximal end 125 of extension pole 110 and structured to be gripped by a user, for example, by a person intending to service an aquarium, an attachment member 115 coupled to a distal end 130 of extension pole 110, and an accessory 120 (such as a cleaning accessory 120) structured to be removably attached to the attachment member 115.

Grip 105 may be constructed from any material suitable for being gripped by a user, such as, for example, soft foam (e.g., Ethylene-Propylene-Diene-Monomer or Nitrile PVC), sponge, polymer, wood, plastic (such as injected-molded plastic), and the like. In one embodiment, grip 105 (and/or the remainder of tool 100) is constructed from material(s) suitable for use both in fresh and salt water environments such as, for example, when tool 100 is used to service an aquariums. In an alternative embodiment, grip 105 is formed integrally with extension pole 110, such as, for example, when grip 105 includes surface texturing etched into or applied to extension pole 110. Grip 105 and/or other portions of tool 100 (such as extension pole 110) may be provided with one or more holes that permit any water trapped within tool 100 to drain after use, so that tool 100 may be properly stored. Of course, a person of ordinary skill in the art would recognize other manners for forming grip 105, and that the present invention as a whole is not intended to be limited by or to any specific type of grip 105.

Figure 3A:
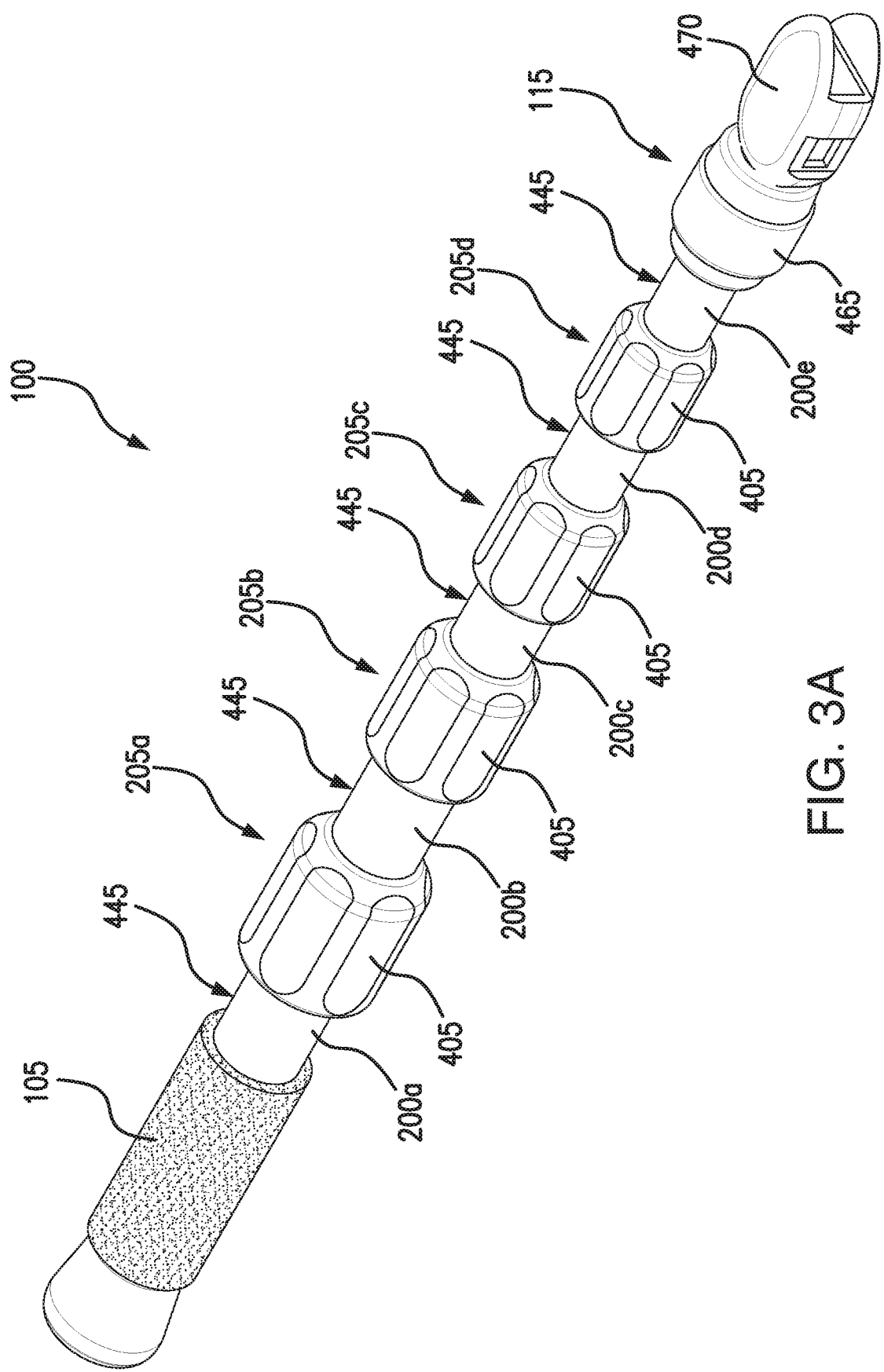
FIG. 3a is a perspective view of the tool illustrated in FIG. 1 adjusted to a short length.
Figure 3B:
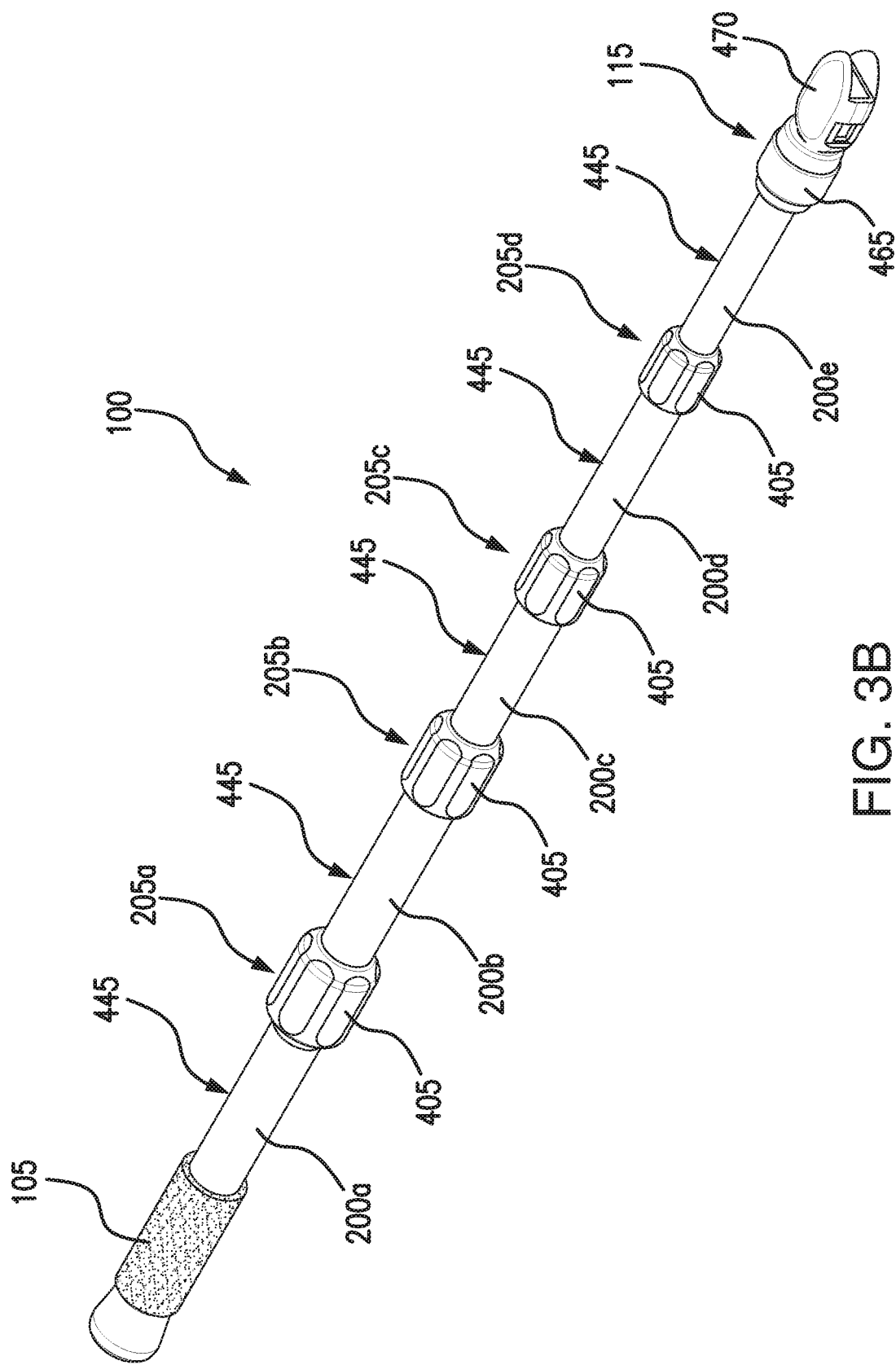
FIG. 3b is a perspective view of the tool illustrated in FIG. 1 adjusted to a fully extended length.

Extension pole 110 is configured to be adjusted to various different lengths, thereby providing the ability to change the overall length of tool 100 to accommodate various different applications (such as, for example, when tool 100 is to be used to service different sized aquariums). Extension pole 110 may be constructed from any material suitable for a desired application, such as, for example, graphite, aluminum carbon fiber, steel, plastic, wood, and the like. Extension pole 110 includes cylindrical segments 200a, 200b, 200c, . . . 200e having progressively decreasing diameters with respect to proximal end 125 of extension pole 110. In this manner, each of cylindrical segments 200a, 200b, 200c, 200d slidably accommodates the adjacent distal cylindrical segment 200, thereby providing a telescoping ability for adjusting tool 100 to a desired length (such as, for example, the short and fully extended lengths shown in FIGS. 3a and 3b). Locking mechanisms 205a, 205b, 205c, 205d having progressively decreasing inner diameters with respect to proximal end 125 of extension pole 110 are provided for selectively and rigidly maintaining cylindrical segments 200a, 200b, 200c, 200e in place after adjustment of tool 100 to the desired length.

Figure 4A:
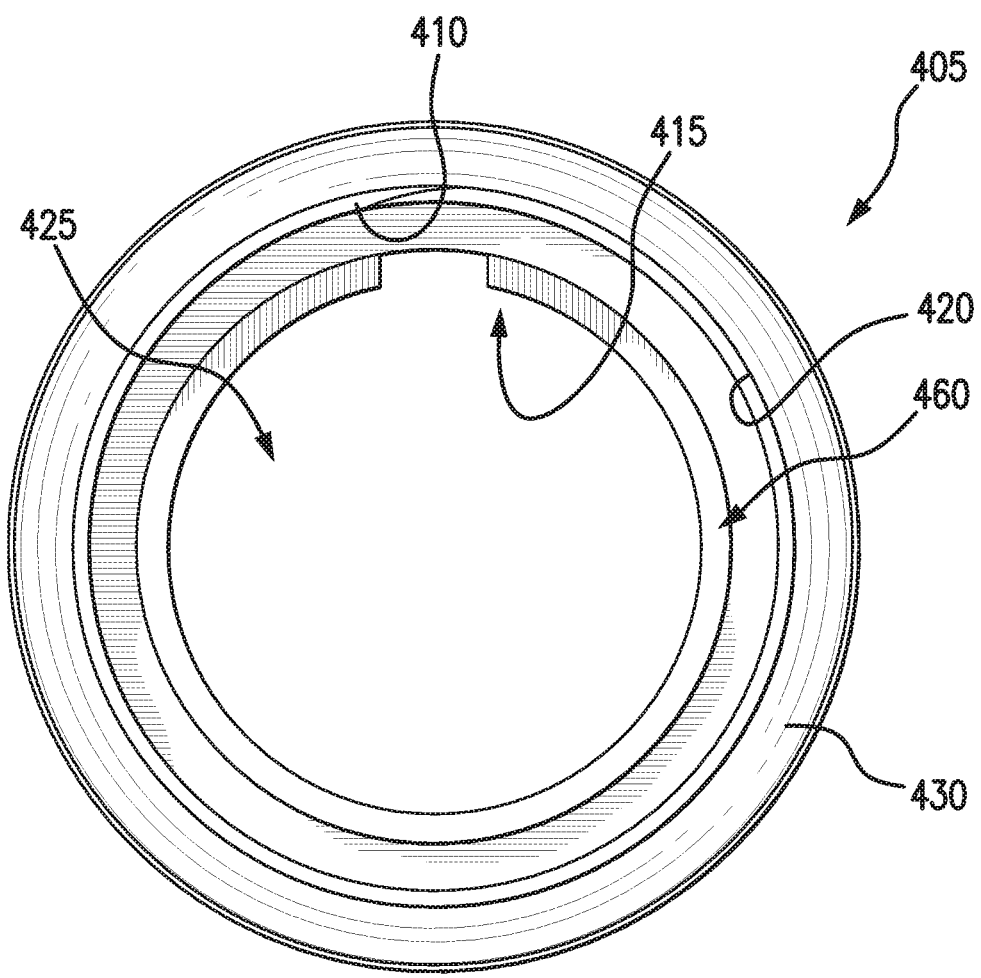
FIG. 4a is a front view of an exemplary locking mechanism, according to the present invention.
Figure 4B:
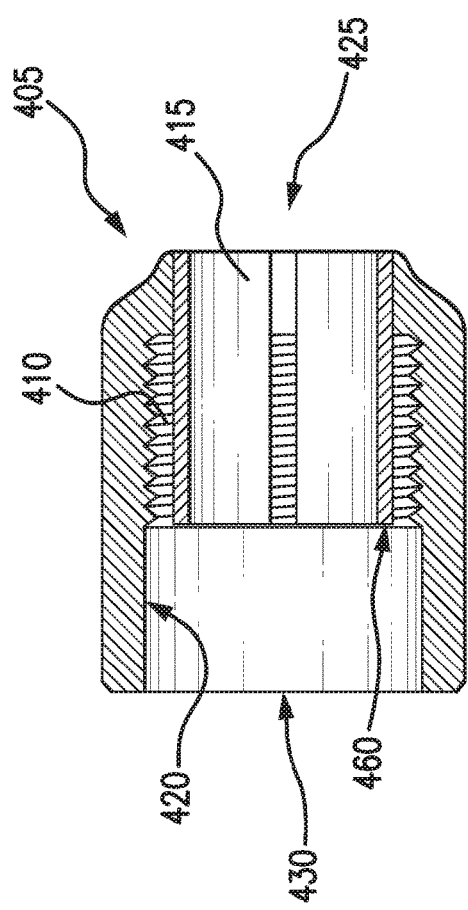
Figure 4C:
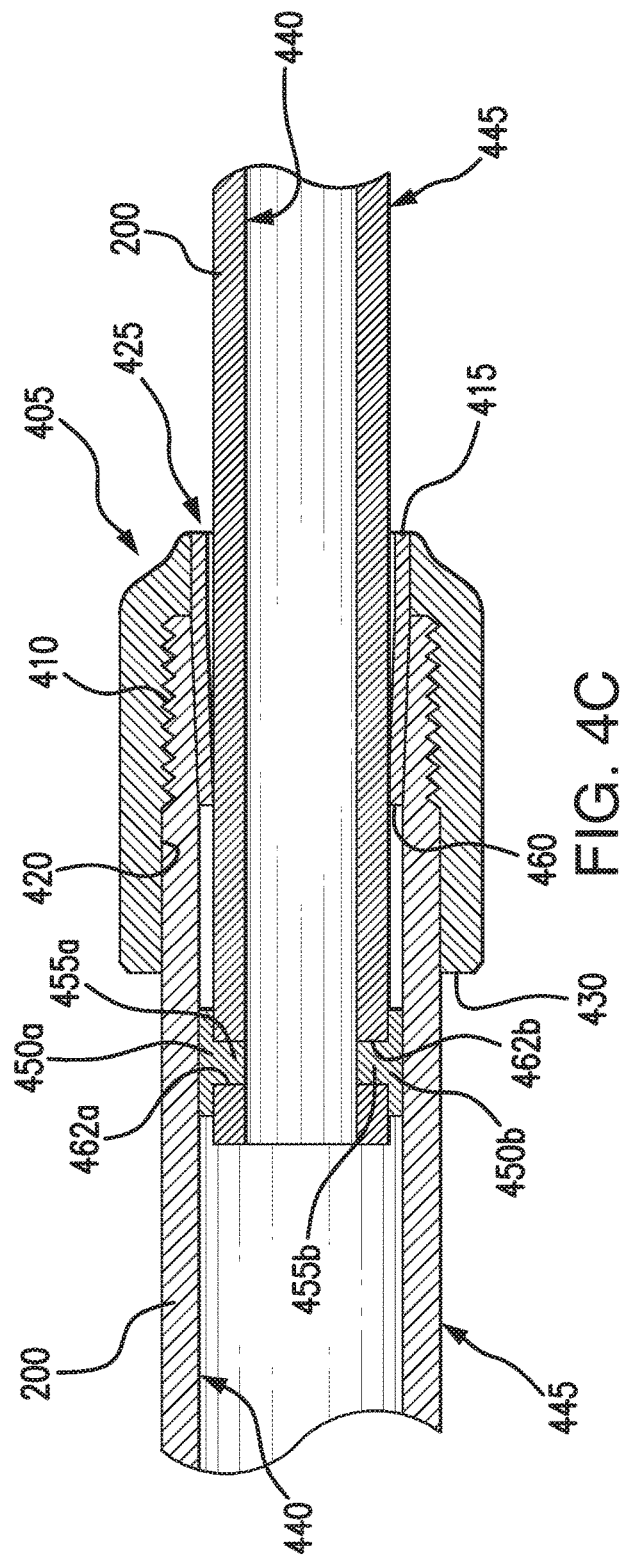
FIG. 4c is a sectional view of the exemplary locking mechanism shown in FIG. 4a coupled to distal and proximal cylindrical members.

Referring now to FIGS. 4a through 4c, there is seen various views of an exemplary locking mechanism 205, according to the present invention. Locking mechanism 205 includes a locking nut 405 having an inside surface 420 provided with inner screw threads 410, a cylindrical tab 415, a first longitudinal bore 425 sized to slidably accommodate an adjacent distal cylindrical segment 200 and a second longitudinal bore 430 sized to slidably accommodate an adjacent proximal cylindrical segment 200 (see FIGS. 1 and 2 showing locking nuts 405a, 405b, 405c, 405d, with nuts 405 positioned closer to distal end 130 of extension pole 110 having smaller diameter bores 425, 430 compared to nuts 405 positioned closer to proximal end 125 of extension pole 110). Inner screw threads 410 of locking nut 405 engage with respective outer screw threads 435 of proximal cylindrical segment 200, such that when locking nut 405 is rotated and tightened with respect to proximal cylindrical segment 200, inside surface 440 of proximal cylindrical segment 200 biases cylindrical tab 415 radially against outside surface 445 of distal cylindrical segment 200, thereby frictionally maintaining distal cylindrical segment 200 in a desired position with respect to proximal cylindrical segment 200 (the contacting surfaces of cylindrical tab 415 and/or proximal cylindrical segment 200 may be provided with additional features to aid in the frictional bond, such as, for example, surface texturing). Outside surface 445 of distal cylindrical segment 200 is provided with stopper tabs 450a, 450b, which engage with proximal leading face 460 of cylindrical tab 415 to prevent distal cylindrical segment 200 from sliding to far distally and/or completely out of locking nut 405 when locking nut 405 is loosened partially with respect to proximal cylindrical segment 200. Stopper tabs 450a, 450b include detents 455a, 455b structured to mate with respective transverse holes 462a, 462b of distal cylindrical segment 200 to maintain stopper tabs 450a, 450b rigidly in proper position (both rotationally and/or longitudinally) with respect to outside surface of 445 of distal cylindrical segment 200. In an alternative embodiment, stopper tabs 450a, 450b are maintained in position using other means, such as glue, screws, nuts, etc. In yet another embodiment of the present invention, stopper tabs 450a, 450b are formed integrally with distal cylindrical segment 200 or, alternatively, are dispensed with entirely.

Figure 5A:
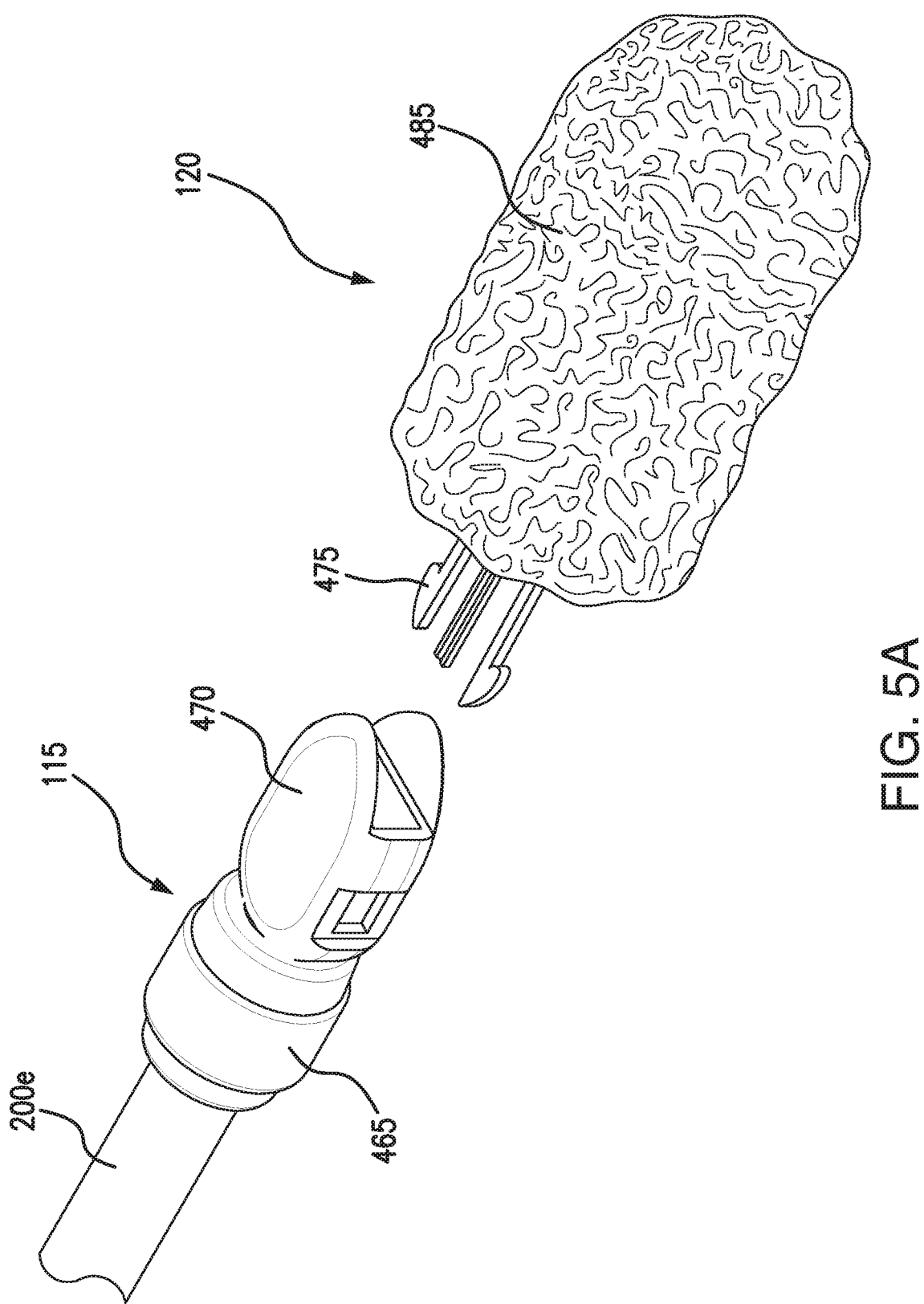
FIG. 5a is a perspective view of an exemplary attachment member, according to the present invention.
Figure 5B:
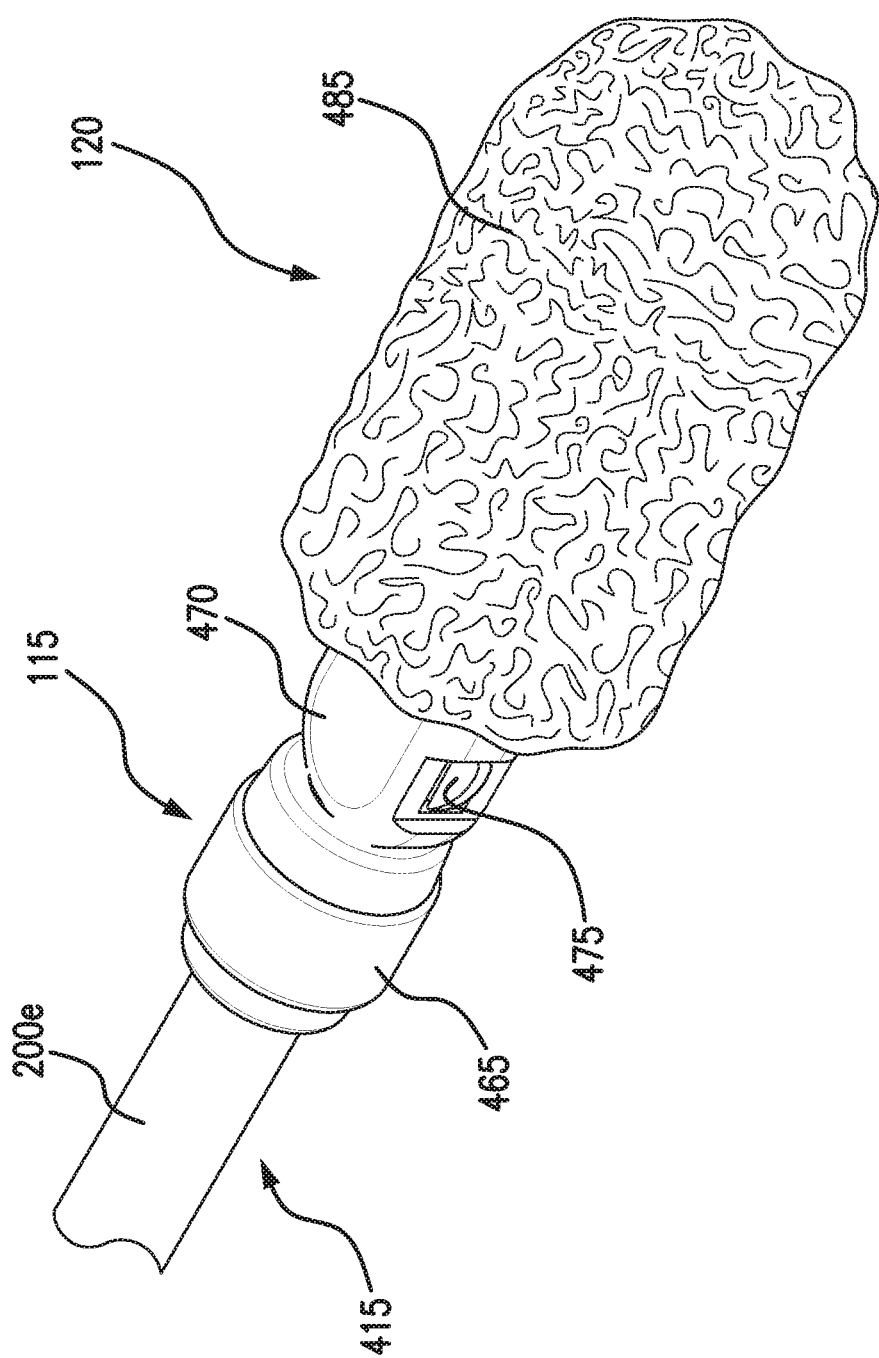
FIG. 5b is a perspective view of the attachment member shown in FIG. 5a with an accessory attached thereto.

Referring now to FIGS. 5a and 5b, there is seen perspective views of attachment member 115. Attachment member 115 is structured to permit an accessory 120 (such as a cleaning accessory 120) to be removably attached to tool 100. For this purpose, attachment member 115 includes a threaded receptacle 465 for rigidly mating with outer screw threads 435 of cylindrical segment 200e (i.e., the cylindrical segment 200 positioned most distally from proximal end 125 of extension pole 110) and a female clip member 470. Female clip member 470 is structured to removably mate with male clip member 475 of accessory 120 in a manner known in the art (see FIG. 5b). In this way, tool 100 may be used with various different types of accessories 120, depending on the application. For example, when tool 100 is to be used to clean an aquarium, accessory 120 may include, for example, a fiber pad, such as a pad for cleaning algae, a sponge, a scraper, etc. In an alternative embodiment shown in FIG. 6, accessory 120 includes a receiving slot 480 for removably mating with any of various operating tips 485, such as a scraper, a sponge, a fiber pad, etc. It should be appreciated that, although the various embodiments described herein include female and male clip members 470, 475 to facilitate removable attachment of accessory 120 to tool 100, a person of ordinary skill in the art would recognize other structures and/or manners for removably attaching accessory 120 to tool 100, and that the present invention as a whole is not intended to be limited by or to any specific type of structure or manner for doing so.

While the present invention has been illustrated by description of various embodiments and while those embodiments have been described in considerable detail, it is not the intention of applicant to restrict or in any way limit the scope of the invention to such details. Additional advantages and modifications will readily appear to those skilled in the art. The invention in its broader aspects is therefore not limited to the specific details and illustrative examples shown and described. Accordingly, departures may be made from such details without departing from the spirit or scope of the invention.

What is claimed is:

1. A tool for cleaning an aquarium, comprising:
   an extension pole having a length, the extension pole including first, second, third, fourth and fifth cylindrical segments, the first cylindrical segment having a first diameter and outer screw threads, the second cylindrical segment having a second diameter less than the first diameter and being slidably received within the first cylindrical segment, the third cylindrical segment having a third diameter less than the second diameter and being slidably received within the second cylindrical segment, the fourth cylindrical segment having a fourth diameter less than the third diameter and being slidably received within the third cylindrical segment, the fifth cylindrical segment having a fifth diameter less than the fourth diameter and being slidably received within the fourth cylindrical segment;
   a first locking nut positioned between and slidably receiving the first and second cylindrical segments, the locking nut being structured to releasably lock the second cylindrical segment into a desired position with respect to the first cylindrical segment;
   a second locking nut positioned between and slidably receiving the second and third cylindrical segments, the locking nut being structured to releasably lock the third cylindrical segment into a desired position with respect to the second cylindrical segment;
   a third locking nut positioned between and slidably receiving the third and fourth cylindrical segments, the locking nut being structured to releasably lock the fourth cylindrical segment into a desired position with respect to the third cylindrical segment;
   a fourth locking nut positioned between and slidably receiving the fourth and fifth cylindrical segments, the locking nut being structured to releasably lock the fifth cylindrical segment into a desired position with respect to the fourth cylindrical segment;
   a grip provided on the first cylindrical segment; and
   an attachment member provided on the fifth cylindrical segment, the attachment member being structured to removably attach at least one cleaning accessory.

2. The tool of claim 1, wherein
   the first locking nut includes a first longitudinal bore for slidably receiving the second cylindrical segment, a second longitudinal bore for slidably receiving the first cylindrical segment, a cylindrical tab for frictionally maintaining the second cylindrical segment into the desired position with respect to the first cylindrical segment, and inner screw threads for engaging the outer screw threads of the first cylindrical segment,
   the second cylindrical segment includes outer screw threads, and the second locking nut includes a first longitudinal bore for slidably receiving the third cylindrical segment, a second longitudinal bore for slidably receiving the second cylindrical segment, a cylindrical tab for frictionally maintaining the third cylindrical segment into the desired position with respect to the second cylindrical segment, and inner screw threads for engaging the outer screw threads of the second cylindrical segment,
   the third cylindrical segment includes outer screw threads, and the third locking nut includes a first longitudinal bore for slidably receiving the fourth cylindrical segment, a second longitudinal bore for slidably receiving the third cylindrical segment, a cylindrical tab for frictionally maintaining the fourth cylindrical segment into the desired position with respect to the third cylindrical segment, and inner screw threads for engaging the outer screw threads of the third cylindrical segment, and
   the fourth cylindrical segment includes outer screw threads, the fourth locking nut includes a first longitudinal bore for slidably receiving the fifth cylindrical segment, a second longitudinal bore for slidably receiving the fourth cylindrical segment, a cylindrical tab for frictionally maintaining the fifth cylindrical segment into the desired position with respect to the fourth cylindrical segment, and inner screw threads for engaging the outer screw threads of the fourth cylindrical segment.

3. The tool of claim 1, wherein the cylindrical segments are constructed from one or more materials suitable for use in a water environment.

4. The tool of claim 3, wherein the materials include one or more of graphite, aluminum, carbon fiber, steel, plastic, and wood.

5. The tool of claim 1, wherein the attachment member includes a female clip member having a hollow interior in fluid communication with an opposing pair of lateral through holes configured to removably mate with a male clip member of the at least one cleaning accessory.

6. The tool of claim 5, wherein the fifth cylindrical segment is provided with outer screw threads and the attachment member includes a threaded receptacle structured to screwably couple with the outer screw threads of the fifth cylindrical segment.

7. The tool of claim 5, wherein the at least one cleaning accessory includes one of a fiber pad, a sponge, and a scraper.

8. The tool of claim 1, further comprising a cleaning accessory attached to the attachment member, wherein the cleaning accessory includes a receiving slot for removably receiving at least one operating tip.

9. The tool of claim 5, wherein the grip is constructed from at least one of Ethylene-Propylene-Diene-Monomer, Nitrile PVC, sponge, polymer, wood, and plastic.

10. A tool for cleaning an aquarium, comprising:
    an extension pole having a length, the extension pole including three or more cylindrical segments having different respective diameters and each including outer screw threads, the segments being arranged in a telescoping configuration to permit the length of the extension pole to be adjusted to a desired length;

a plurality of locking nuts each having inner screw threads for engaging a respective one of the outer screw threads of all but the most distal one of the segments and structured to releasably lock adjacent ones of the segments to one another;

a grip provided on a most proximal one of the segments; and an attachment member provided on a most distal one of the segments, the attachment member being structured to removably attach at least one cleaning accessory.

11. The tool of claim 10, wherein the segments are constructed from one or more materials suitable for use in a water environment.

12. The tool of claim 11, wherein the materials include one or more of graphite, aluminum, carbon fiber, steel, plastic, and wood.

13. The tool of claim 10, wherein the attachment member includes a female clip member having a hollow interior in fluid communication with an opposing pair of lateral through holes configured to removably mate with a male clip member of the at least one cleaning accessory.

14. The tool of claim 13, wherein the attachment member includes a threaded receptacle structured to screwably couple with the outer screw threads of the most distal one of the segments.

15. The tool of claim 13, wherein the at least one cleaning accessory includes one of a fiber pad, a sponge, and a scraper.

16. The tool of claim 10, further comprising a cleaning accessory attached to the attachment member, wherein the cleaning accessory includes a receiving slot for removably receiving at least one operating tip.

17. The tool of claim 13, wherein the grip is constructed from at least one of Ethylene-Propylene-Diene-Monomer, Nitrile PVC, sponge, polymer, wood, and plastic.

* * * * *